United States Patent

Cosman

Patent Number: 5,734,386
Date of Patent: Mar. 31, 1998

[54] SYSTEM AND METHOD FOR DISPLAYING TEXTURED POLYGONS USING PLANAR TEXTURE INTERPOLATION

[75] Inventor: Michael A. Cosman, South Jordan, Utah

[73] Assignee: Evans & Sutherland Computer Corporation, Salt Lake City, Utah

[21] Appl. No.: 526,052

[22] Filed: Sep. 8, 1995

[51] Int. Cl.$^6$ .................................................. G06T 15/40
[52] U.S. Cl. .................................................. 345/430
[58] Field of Search ................................ 395/125, 128, 395/129, 130, 119, 120

[56] References Cited

U.S. PATENT DOCUMENTS

| | | | |
|---|---|---|---|
| 5,230,039 | 7/1993 | Grossman et al. | 395/130 |
| 5,333,245 | 7/1994 | Vecchione | 395/129 X |
| 5,490,240 | 2/1996 | Foran et al. | 395/130 |
| 5,550,960 | 8/1996 | Shirman et al. | 395/130 |

OTHER PUBLICATIONS

Heckbert, Paul, "Texture Mapping Polygons in Perspective", N.Y.I.T. Computer Graphics Lab, Technical Memo No. 13, 1983.

Primary Examiner—Phu K. Nguyen
Assistant Examiner—Cliff N. Vo
Attorney, Agent, or Firm—Thorpe, North & Western, LLP

[57] ABSTRACT

Improved computer graphics system texture interpolation is provided using texture rules and planar texture interpolation. A texture rule is defined which characterizes texture variation within an area defined by a set of texels. The texture rule is used to select a texture plane which approximates the texture mapped to a pixel. This texture plane is used to generate a texture value for the pixel. In one embodiment, the texture rule identifies a triangle pair defined by four texels. One of these triangles is selected based on the position of the pixel relative to the texels. The pixel is then mapped to the plane defined by the selected triangle and the texture value for the pixel is calculated by interpolating the texture value at the location in the plane to which the pixel was mapped.

23 Claims, 7 Drawing Sheets

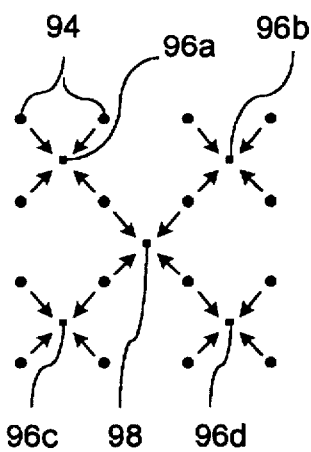
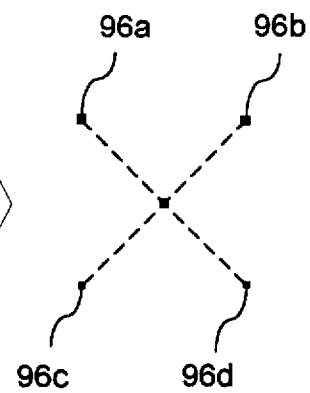
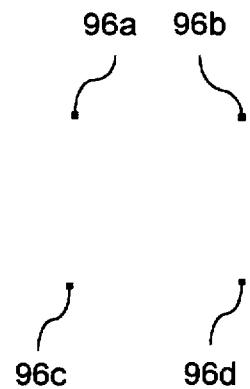
FIG. 5a      FIG. 5b      FIG. 5c
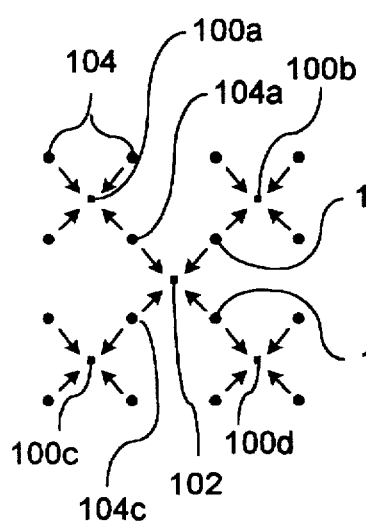
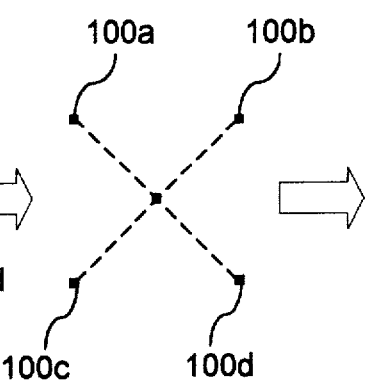
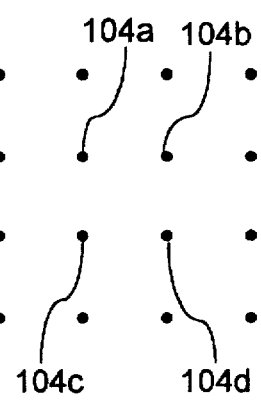
FIG. 6a      FIG. 6b      FIG. 6c

SYSTEM AND METHOD FOR DISPLAYING TEXTURED POLYGONS USING PLANAR TEXTURE INTERPOLATION

FIELD OF INVENTION

The present invention relates to computer graphics systems and more specifically to texture mapping using planar texture interpolation.

BACKGROUND AND SUMMARY OF THE INVENTION

Conventional computer graphics systems display images on a display screen having an array of picture elements (pixels). The displayed image typically represents a collection of graphic objects. The displayed image is created by subdividing the graphic objects into smaller elements, typically polygons, that can be numerically represented in terms of size, color, location and other characteristics. These representations are stored in a memory and processed by the computer graphics system when the graphic objects are to be displayed. This process, generally referred to as polygon rendering when the elements are polygons, generates pixel data that defines the visual characteristics for the pixels in the display screen. This pixel data then is used to generate electrical signals that sequentially illuminate the pixels on the display screen.

The visual characteristics of a polygon may be enhanced using a technique known as texture mapping. Texture is analogous to a digital wallpaper that is applied to surfaces, e.g., polygons. Texture can represent changes in any spatially varying surface parameter and is typically used to represent changes in intensity, color, opacity, or thematic content (such as surface material type). Typically, texture is defined as a two-dimensional array of data. Data elements in the array are called texels and the array is called a texture map. During the polygon rendering process, the texture data is combined with the other attributes of the polygon to form the final pixel data values.

The images displayed by the computer graphics systems discussed above are subject to a display problem known as texture aliasing. Texture aliasing typically is evidenced by undesirable visual effects such as the appearance of jagged lines in the displayed image. Texture aliasing generally occurs when the size of a texel (i.e., the area to which a given texel is mapped) and the size of the pixels to which the texel is mapped are different.

To prevent aliasing when texels are larger than pixels, conventional computer graphics systems typically use a bi-linear blend technique to blend the values of the texels that surround the pixel being processed. This technique generally produces texture values that change more smoothly from texel to texel than when blending is not used.

To prevent aliasing when texels are smaller than pixels, conventional computer graphics systems typically use a texture mapping technique known as MIP mapping. The MIP mapping technique uses a texture map that has a succession of different levels of texture detail. During polygon rendering, the appropriate level of detail is selected based on a comparison of texel size to pixel size. Since a MIP map will have a discrete number of levels, MIP map level selection will usually involve interpolating between successive levels to match the texel size with the pixel size. MIP mapping and the use of MIP maps for texture mapping is treated in a paper entitled "Pyramidal Parametrics" by Lance Williams, published July 1983 in *Computer Graphics*, volume 17, no. 3. The article has been identified by the Association For Computing Machinery as ACM 0-89791-109-1/83/007/0001.

In a typical computer graphics system, both MIP map interpolation and bi-linear blending are continuously in use. This is because a texel can be simultaneously larger and smaller than the pixel to which it is mapped. For example, when a texel is mapped to a three dimensional object, the texel may be perspectively compressed with respect to the pixel. As a result, a given texel's long dimension may be larger than the pixel while the texel's perspectively compressed dimension is smaller than the pixel. In this case, a MIP map level-of-detail is selected so that the texel's perspectively compressed dimension is the same size of the pixel. Then, bi-linear blending is used to blend the four values that define the texel. Consequently, during the rendering process, the texture look-up within each MIP level of detail are often bi-linearly blended in the spatial domain to "erase" the hard boundaries between texels while MIP level-of-detail transitions are often blended in the level-of-detail domain to hide level-of-detail transition effects.

The spatial bi-linear blend technique discussed above produces a number of visual side effects. The cause of these side effects can be more easily understood using an abstraction where the magnitudes of the texels, i.e., the texture intensity values, in the MIP map represent height in a three dimensional space. Each set of four adjacent texels that form a quadrilateral in the MIP map define the vertices of a polygon surface within the quadrilateral. The height of this polygon surface at a given point represents the intensity at a corresponding point within the quadrilateral.

The surface intensity values between the vertices are derived by the bi-linear blend technique. Consequently, the surface consists of straight lines or "slopes" that connect the four vertices and a curved/warped surface in the interior of the quadrilateral. This surface is continuous everywhere since there are no "step" changes in intensity. There are, however, "creases" in the surface. These creases generally occur along the straight lines that connect the vertices. In other words, these creases form the "edges" of the polygon. The "height" of the surface along each edge is a straight ramp from one texel value (i.e., polygon vertex) up or down to another texel value.

Two primary side effects resulting from the texture intensity surface topology discussed above are evident in the displayed texture. First, the intensity in the interior of each quadrilateral interpolates to a central texture value that is the average of the four texel values at the corners. However, this is seldom the correct central value since it is independent of which texels have which particular values. In this sense, the bi-linear blending process is incapable of determining whether the surface defines a "ridge" or a "valley."

Second, the creases at the edges of each polygon are discontinuities in the slope of the texture intensity function and cause the viewer's eye and brain to construct corresponding Mach bands. Further, because the blending process always "flattens" the interior of each texel region, it ensures that the Mach banding is enhanced or exaggerated. In effect, texture intensity "ramps" are converted to apparent "steps" by the flattening and subsequent Mach banding effects. As a result, an entirely new set of apparent edges arises from these effects, even though the surface itself is continuous.

One visual consequence of these side effects is that the "edges" in the motif (e.g., roads in a global texture map) often take on a "pixelated" or blocky, sawtooth appearance. Consequently, a need exists for a computer graphics system that displays textured images with less texture aliasing than the bi-linear blending technique.

The present invention provides a system and method for displaying textured objects with reduced texture aliasing by using texture rules (generally defining texture planes) and planar texture interpolation. The texture rules are used to identify texture planes which best approximate the texture variation in the areas between texels. When a pixel is processed, the texture value for a pixel is calculated by mapping the pixel to a location in the plane identified by the texture rule and interpolating the texture value at that location in the plane.

In one embodiment of the present invention, texels in the MIP map are grouped into quadrilaterals defined by four adjacent texels. Each quadrilateral, in turn, is divided into two pairs of triangles by the quadrilateral's two diagonals. One of these diagonals is selected as the texture rule depending on which pair of triangles best approximates the variation of the texture within the quadrilateral.

The relationship between the triangle pair and the texture variation within the quadrilateral is more easily understood by again referring to the abstraction where the magnitudes of the texels defining the quadrilateral represent height in a three dimensional space. In this space, the three vertices of each triangle define planes where each point within the plane represents the texture value at a corresponding location in the quadrilateral.

Since each diagonal divides the quadrilateral into two triangles, each triangle pair usually defines a bi-planar ridge or a valley within the quadrilateral. Moreover, the two triangle pairs will define different ridges or valleys. Thus, depending on the actual texture variation within the quadrilateral, one of the two triangle pairs will provide a better approximation of the texture values within the quadrilateral.

After determining which triangle pair best approximates the actual texture variation, a texture rule is generated to identify the diagonal associated with that triangle pair. In one embodiment, this texture rule is stored with one of the associated texels in the MIP map and is retrieved for use when interpolating texture values from the MIP map during the rendering process.

During the rendering process, the texture value for a pixel is calculated by interpolating a texture value from the four texels immediately surrounding the pixel. The texture rule is retrieved from the appropriate texel and used to select one of the triangle pairs defined by the four texels. One triangle from the selected triangle pair is selected based on the location of the pixel within the area defined by the four texels. The texture value for the pixel is obtained by mapping the pixel's location to a point within the texture plane defined by the selected triangle. Finally, the texture value at this location is interpolated using the texel values defined at the vertices of the selected triangle.

The improvements in displayed texture obtained with the bi-planar texture interpolation technique include reduced Mach bands along the exterior edges of each region, better approximation of motif edges that are not aligned with the texel grid and better sharpness and contrast for high-contrast changes in texture motif. In sum, the planar interpolation technique provides a better approximation of the texture values between texels thereby increasing the quality of the displayed image.

BRIEF DESCRIPTION OF THE DRAWINGS

In the drawings which constitute a part of this specification, an exemplary embodiment exhibiting various objectives and features hereof is set forth, specifically:

FIGS. 5a, 5b and 5c are graphical representations of a portion of a texture rule generation process according to the present invention;

FIGS. 6a, 6b and 6c are graphical representations of a portion of an alternative texture rule generation process according to the present invention;

DESCRIPTION OF THE PREFERRED EMBODIMENT

As required, a detailed illustrative embodiment of the present invention is disclosed herein. However, computer graphics systems, component operating structures, graphics processing, mapping techniques, rule generating techniques, planar interpolation techniques and blending techniques as well as other elements utilized in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
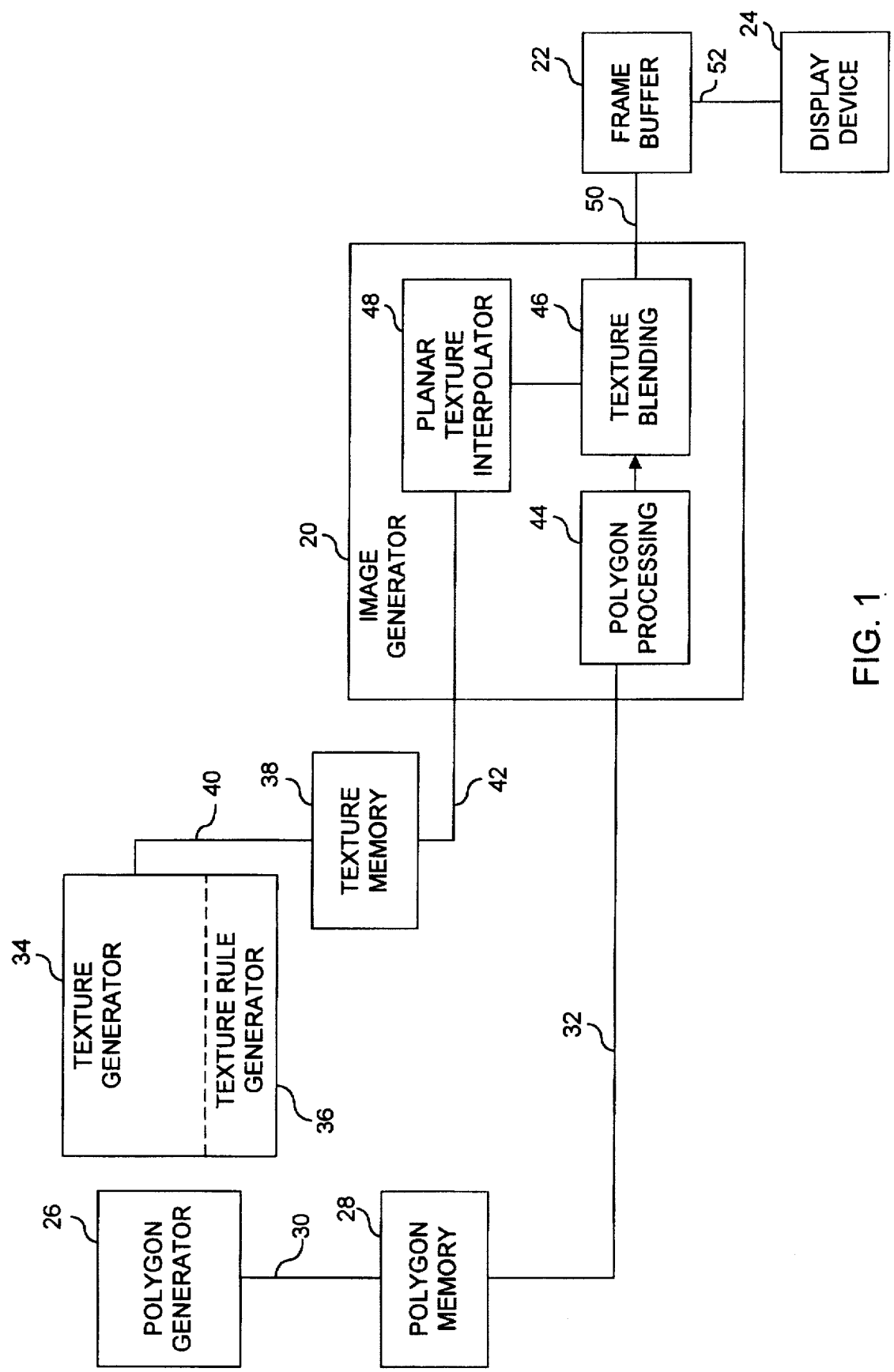
FIG. 1 is a block diagram illustrating one embodiment of a system constructed according to the present invention.

Referring initially to FIG. 1, one embodiment of a computer graphics system constructed according to the present invention is shown. As discussed in detail below, polygon and texture data is processed by an image generator 20 (central right) then stored in a frame buffer 22 before being displayed on a display device 24.

In the disclosed embodiment, a polygon generator 26 creates polygon definitions representative of polygons to be displayed. These polygon definitions are stored in a polygon memory 28 over the line 30 and are accessible by the image generator 20 over the line 32. In addition, a texture generator 34 is used to create texture map data that will be mapped to textured polygons.

According to the present invention, a texture rule generator 36 is associated with the texture generator 34. The texture rule generator 36 generates one texture rule for every set of four adjacent texels in the texture map that form a quadrilateral in the texture map space (not shown). Each texture rule identifies which of the corresponding quadrilateral's two diagonals defines a triangle pair that best approximates the texture variation within the quadrilateral. Once the texture rule is determined, it is stored along with the texture map data in a texture memory 38 over the line 40.

When a textured polygon is to be displayed, the image generator 20 retrieves the corresponding polygon definitions from the polygon memory 28 over the line 32 and the corresponding texture map data from the texture memory 38 over the line 42. The image generator 20 processes the polygon definitions (block 44) generating pixel data for each pixel influenced by the polygon. The pixel data for each pixel is then blended (block 46) with the texture data mapped to that pixel.

Interpolated texture data for the pixels is generated by a planar texture interpolator 48 using the texture rules. For each pixel, the planar texture interpolator 48 selects the four texels that when mapped onto the polygon form a quadrilateral surrounding the position on the polygon where the pixel is mapped. The planar texture interpolator 48 uses the texture rule associated with the quadrilateral to select the appropriate triangle pair within the quadrilateral. Next, one triangle from the selected triangle pair is selected depending on the position of the pixel within the quadrilateral. Once the appropriate triangle is selected, the planar texture interpolator 48 interpolates a texture value from a texture plane defined by the selected triangle. In other words, a point within the plane defined by the triangle is mapped to the pixel and a texture value is calculated at that point in the plane using planar interpolation techniques. This interpolated value is then blended with the corresponding pixel data as discussed above.

After the pixel data and the texture data are blended, the resultant pixel data is stored in the frame buffer 22 over the line 50. This pixel data is sequentially retrieved from the frame buffer 22 and sent to the display device 24 over the line 52. In the display device 24, the pixel data is converted to electrical signals that illuminate the corresponding pixels on the display device's display screen (not shown) to form the desired image.

Figure 2:
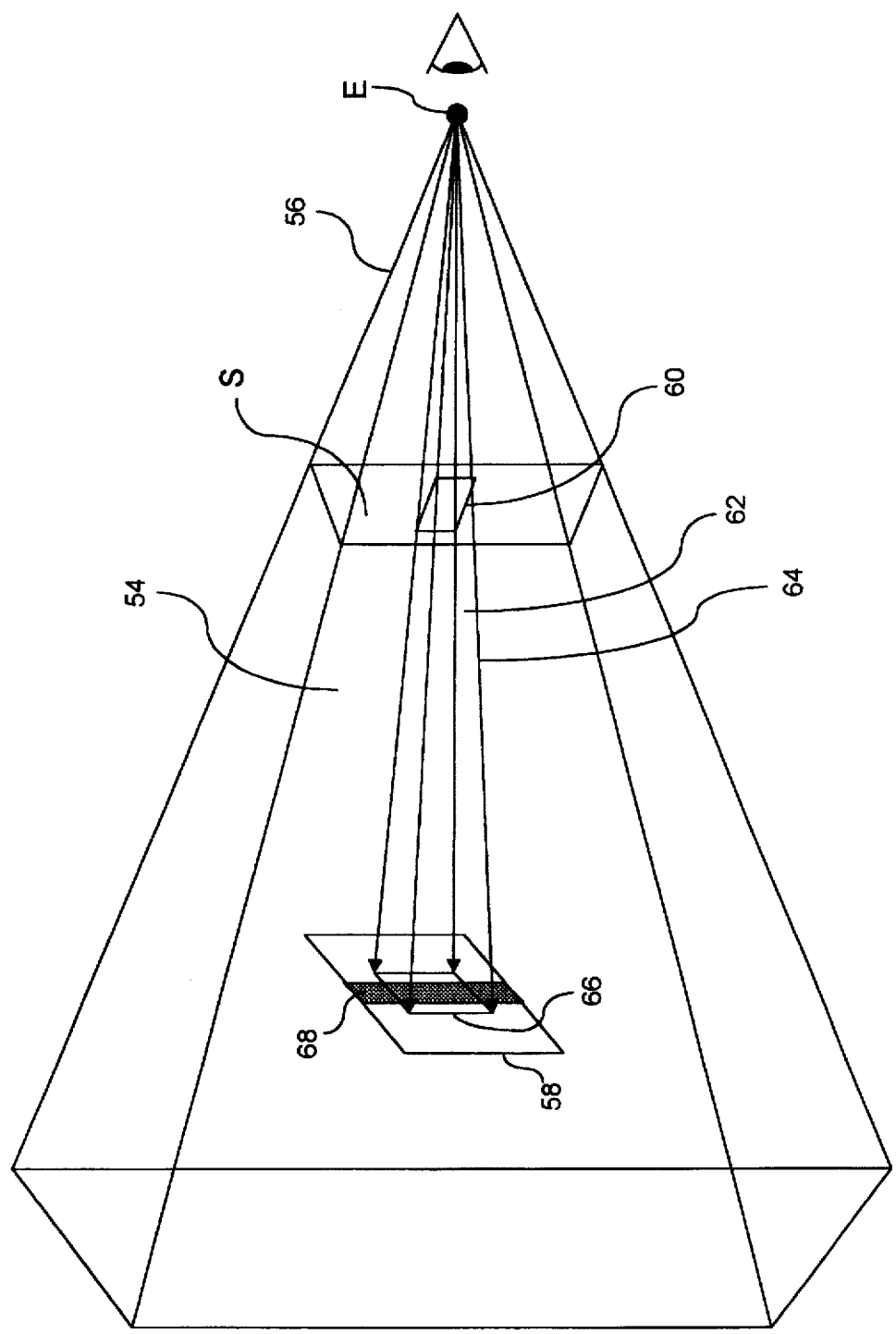
FIG. 2 is a view frustum radiating from an eye-point to screen space and model space as treated herein.

Referring now to FIG. 2, the principles and operation of the disclosed embodiment will be discussed in more detail. A three-dimensional model space 54 is defined by a frustum of vision 56 defined by the view from an eye-point E through a display screen S. Visual objects such as the polygon 58 that are defined within the model space 54 are mapped to the two-dimensional display screen S for viewing by a viewer at the eye-point E.

The display screen S contains a number of pixels 60 (shown greatly exaggerated for illustration purposes) each of which has an associated pixel frustum 62 defined by four rays (e.g., ray 64) extending from eye-point E through the corners of the pixel 60. The intersection of the pixel frustum 62 with the polygon 58 forms a pixel footprint 66 on the polygon which defines how the polygon 58 is mapped to the pixel 60. Thus, the polygon characteristics defined within the pixel footprint 66 affect the visual characteristics of the pixel 60.

The polygon 58 depicted in FIG. 2 is defined with a texture 68 represented by shaded portions on the polygon 58. The texture 68 is defined in a texture map (not shown) and mapped to the polygon 58 with a predefined texture orientation on the polygon. Thus, the texture pattern mapped onto the polygon 58 within the pixel footprint 66 also influences the visual characteristics of the pixel 60.

Figure 3:
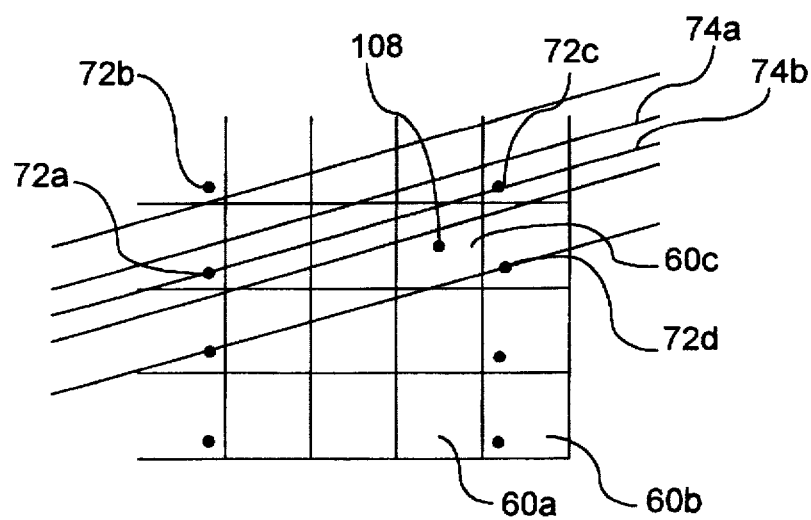
FIG. 3 is a partial plan view of the screen space and model space of FIG. 2.

Referring now to FIG. 3, a partial plan view of the display screen S and the model space 54 from FIG. 2 is shown. The pixels in the display screen S are represented, for example, by the squares 60a and 60b. A simplified mapping of a texture pattern to the screen space is represented, for example, by the texels 72a and 72b and intensity lines 74a and 74b. The texels depicted in FIG. 3 represent where the texels from the MIP map map to the screen space. The intensity lines represent a hypothetical texture defined by the texture map where the distance between the lines represents the intensity of the texture pattern. In this case, closer lines represent higher intensity.

The texture value for a given pixel (e.g., pixel 60c) is calculated by interpolating a single value from surrounding texels (e.g., texels 72a, 72b, 72c and 72d). In accordance with the present invention, to more accurately approximate the true texture variation within the quadrilateral defined by the texels, the disclosed embodiment generates a texture rule which reflects the texture variation.

Figure 4A:
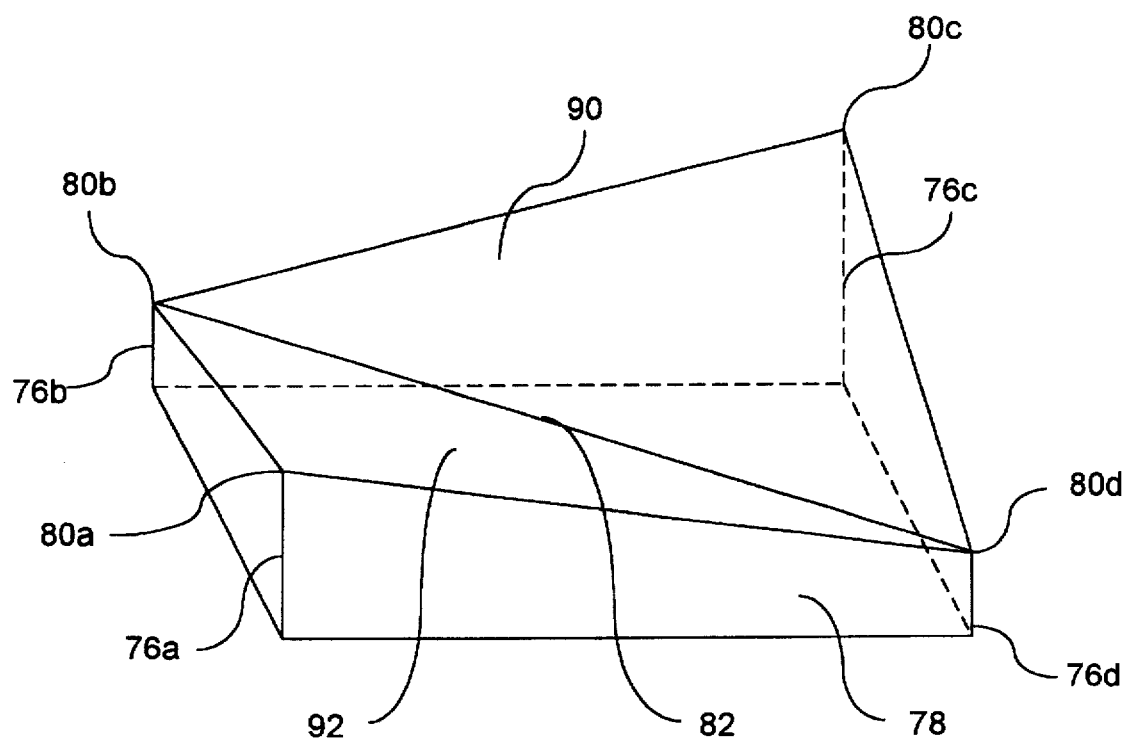
FIGS. 4a and 4b are representations of bi-planar approximations of texture data according to the present invention.
Figure 4B:
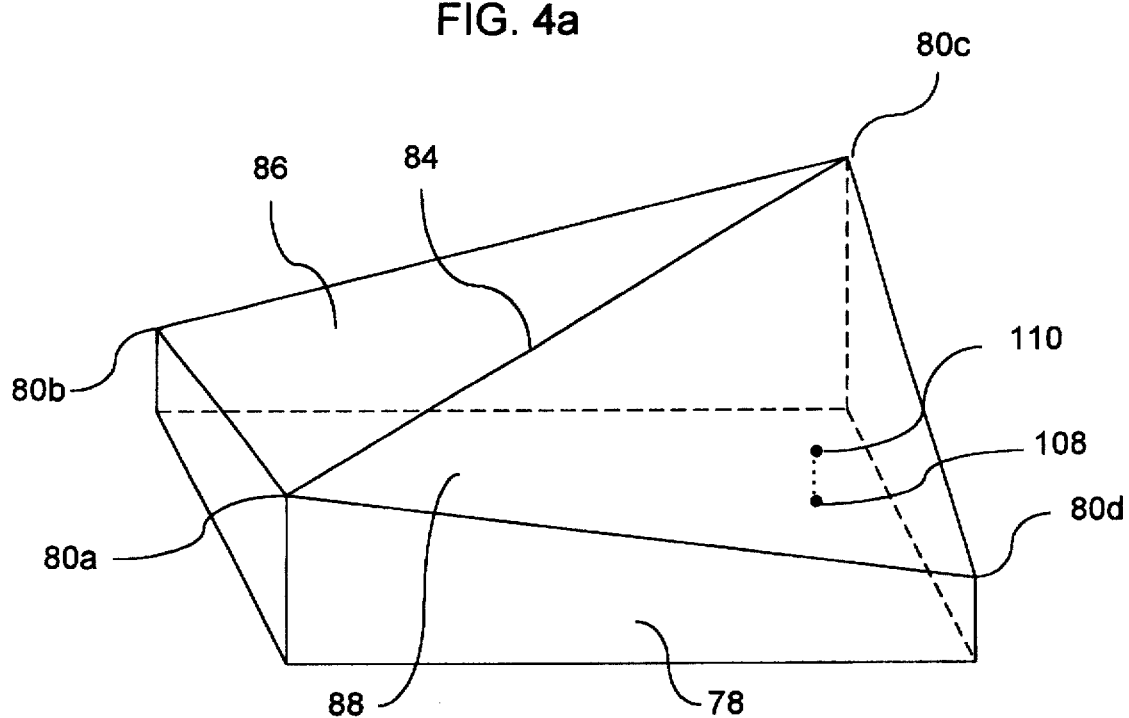

Referring to FIGS. 4a and 4b, a three dimensional abstraction of the texels from FIG. 3 is depicted. Vertical lines 76a, 76b, 76c and 76d represent the magnitudes, i.e., texture intensity, of texels 72a, 72b, 72c and 72d (FIG. 3), respectively. Thus, the actual intensity values in the area between the texels (quadrilateral 78) would be represented by a surface above quadrilateral 78 and would include vertices 80a, 80b, 80c and 80d at the top of vertical lines 76a, 76b, 76c and 76d, respectively. As shown in FIGS. 4a and 4b, if the intensity surface is approximated by triangles 86, 88, 90 and 92 defined by vertices 80a, 80b, 80c and 80d, two different triangle pairs can be defined depending upon whether diagonal 82 or diagonal 84 is used.

As FIGS. 3, 4a and 4b illustrate, planes 86 and 88 defined by diagonal 84 in FIG. 4b provide a better approximation of the actual texture surface (represented by the lines 74a and 74b, etc., in FIG. 3) than planes 90 and 92 defined by diagonal 82 in FIG. 4a. Thus, diagonal 84 would be coded as the texture rule for the quadrilateral 78.

Referring now to FIG. 5, a preferred method of generating the texture rule based on the texture behavior at the center of a quadrilateral will be discussed. FIG. 5 shows the spatial relationships underlying the rule-determination process when texture source data with twice the detail of the texture map ("2X source data") is available. Output texture data 96a, 96b, 96c and 96d is created by averaging the 2X source data (e.g., points 94) in groups of four. In practice, any convolution kernel can be used as long as the underlying relationships are preserved.

As FIG. 5a illustrates, in addition to output data 96a, 96b, 96c and 96d, a temporary center value 98 is created. As represented by FIG. 5b, this temporary center value 98 is used to determine which diagonal (i.e., diagonal 96c–96b or 96a–96d) lies closest to the original 2X motif at the output texel center. The value in the center of each diagonal is simply the average of the two texels at the defining corners. Thus, the diagonal with the center that lies closest to the temporary center value 98 is coded as the texture rule.

In the disclosed embodiment, the texture rule for each quadrilateral replaces the least significant bit of the lower-left output texel (e.g., square 96c in FIG. 5c) in the quadrilateral. Thus, each texel that defines a lower-left corner of a quadrilateral in the two-dimensional texture array will have a texture rule encoded in its least significant bit.

When 2X source data is not available, the above process is modified slightly. Referring to FIG. 6, when 1X source data (e.g., points 104) is used, the information that indicates the texture value in the center of the quadrilateral is not available. Thus, this information must be inferred from the other texel data. As illustrated in FIG. 6a, a temporary lower level-of-detail (as represented by squares 100a, 100b, 100c, 100d and 102) is developed to approximate the texture variation. This data is used to generate the texture rule as discussed above. Thus, as represented by FIGS. 6a and 6c, the input data (e.g., points 104a, 104b, 104c and 104d) will be output unchanged except for the substitution of the rule bit in the least significant bit of each texel (e.g., texel 104c)

that defines the lower left corner of a quadrilateral in the texture map. The 1X process derives the correct rule (relative to having 2X source data) about 71% of the time. Nevertheless, this seems to be the 71% with the greatest visual significance.

In sum, for both 1X and 2X source data, a texture rule is generated for every set of four adjacent texels that define a quadrilateral in the texture map. Accordingly, a texture rule is stored in every texel at every MIP level-of-detail in the texture map.

When a textured polygon is to be displayed, the image generator 20 (FIG. 1) retrieves the polygon definitions corresponding to that polygon from the polygon memory 28. These polygon definitions are processed using standard polygon rendering techniques. The polygon rendering process involves processing each polygon to determine the influence each polygon has on the pixels in the display. This involves determining which pixels are influenced by a given polygon and determining the effect of the polygon in terms of characteristics such as color and transparency on those pixels. During a typical polygon rendering process, a polygon is effectively sampled at intervals across the face of the polygon with each sample location corresponding to one of the pixels on the display screen. This "sample" consists of data, called pixel data, that represents the characteristics of the polygon at that location. This and other details of the polygon rendering process are well known in the art of computer graphics systems. For example, detailed operations and structures of polygon manipulation and display may be found in the book *Principles of Interactive Computer Graphics*, 2nd Edition, Newman and Sproull, McGraw-Hill Book Company, 1979.

If a polygon is textured, the pixel data generated from the polygon definitions is combined with the texture map data that is mapped to that polygon. The texture mapping is performed on a pixel-by-pixel basis as well. Thus, the final pixel data for a given pixel consists of a blend of the polygon characteristics that influence that pixel and the texture map characteristics that influence the same pixel. However, in accordance with the present invention, the texture map data associated with a given pixel may be generated using the planar interpolation technique described herein.

The image generator 20 retrieves texture map data from the texture memory 38 and maps it onto the polygon to be displayed. The process of applying texture patterns to surfaces is generally referred to as "texture mapping" and is a well known and widely used technique in computer graphics. For example, see U.S. Pat. No. 4,855,943 (System For Texturing Computer Graphics images, Robinson) and the textbook *Computer Graphics: Principles and Practice*, 2nd Edition, Foley, van Dam, Feiner & Hughes, (Reprinted in 1991) (1990), by Addison-Wesley Publishing Company, at section 16.3.2.

The planar texture interpolator 48 interpolates a single texture value for each pixel from the four texels immediately surrounding each pixel. In the disclosed embodiment, the planar texture interpolator 48 (FIG. 1) retrieves the texture rule for a given set of four texels from the least significant bit of the lower left texel. As discussed above, the texture rule identifies one of the diagonals in the quadrilateral defined by these four texels. This diagonal, in turn, identifies the triangle pair that define the texture planes that best approximate the texture variation within the quadrilateral.

After the proper triangle pair is selected, the texture plane interpolator 48 determines which triangle of this triangle pair defines the plane that will be used to calculate the texture value for the pixel. This is done by comparing the pixel's U-fraction with its V-fraction (from the mapped U-V space). For example, referring to FIG. 3, assuming the texture rule identifies the diagonal with texel 72a and texel 72c as its vertices. Since the pixel is closer to the right in the quadrilateral defined by the texels 72a, 72b, 72c and 72d than it is to the top, the pixel's U-fraction is greater than its V-fraction. Consequently, the triangle defined by texels 72a, 72c and 72d will define the plane to be interpolated.

The pixel's texture value is interpolated by mapping the pixel's location within the quadrilateral (e.g., point 108 in FIGS. 3 and 4b) to a point in the selected plane (e.g., point 110 in FIG. 4b). The texture value at that point can be interpolated from the texture values defined at the triangle vertices (e.g., triangle 88 with vertices 80a, 80c and 80d in FIG. 4b) using standard planar interpolation techniques.

In one embodiment of the present invention, the planar interpolation can be performed using standard bi-linear blend hardware or processes. The bi-linear blend process is converted to planar interpolation by displacing one texel "vertex" up or down into the plane defined by the other three vertices. Thus, the plane previously defined solely by the selected triangle is now defined by the values at the selected triangle's three vertices as well as a modified value of the quadrilateral texel that does not define a vertex of the selected triangle.

Figure 7:
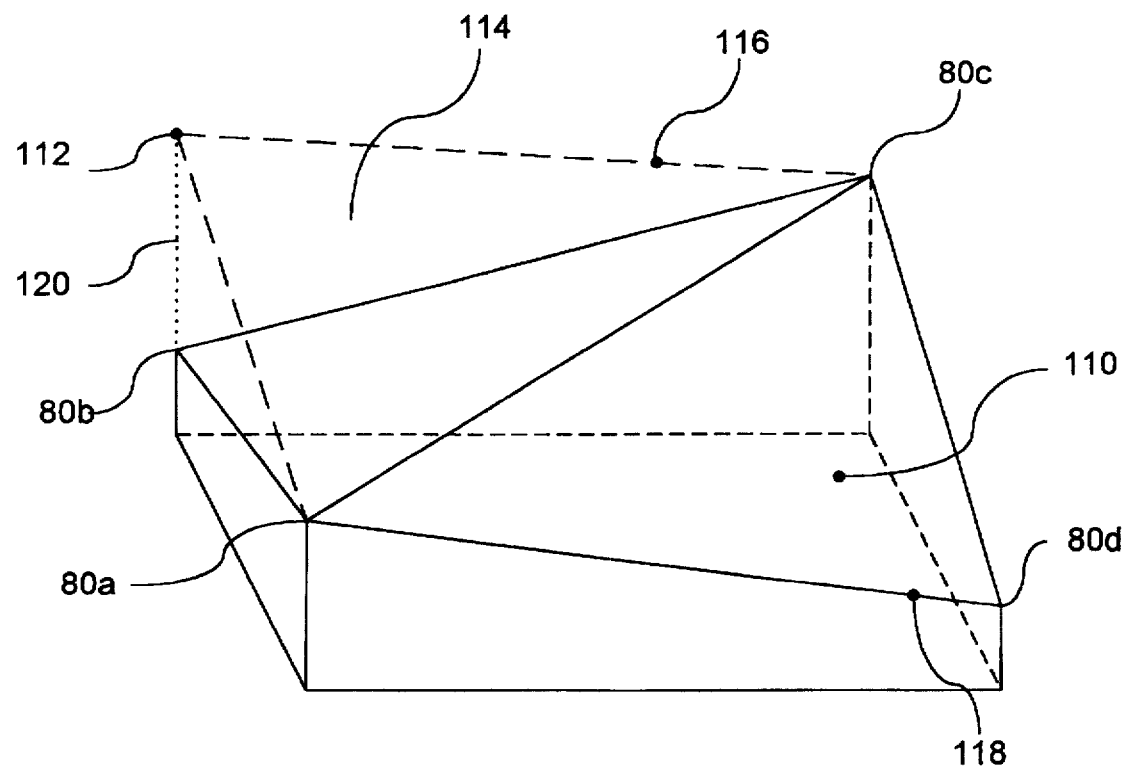
FIG. 7 is a graphical representation of one embodiment of the planar interpolation process according to the present invention.

FIG. 7 shows how this process could be used in the case of quadrilateral 78 depicted in FIG. 4b. The selected triangle 88 is defined by vertices 80a, 80c and 80d. As illustrated by the dotted line 120, the value of vertex 80b is modified so that the modified vertex 112 lies in the plane defined by vertices 80a, 80c and 80d. Thus, the plane 114 defined by vertices 80a, 112, 80c and 80d is used in the bi-linear blend process.

The bi-linear blend process computes the texture value for the pixel by interpolating the value at the point 110. Here, the value at point 116 is calculated by averaging the values of vertices 112 and 80c. The value at point 118 is calculated by averaging the values of vertices 80a and 80d. Finally, the value for point 110 is calculated averaging the values of points 116 and 118.

As illustrated above, the input to each leg of the bi-linear blend process gets either an original or a "planarized" texture value depending on the state of the texture rule and the U-V fraction compare bits. In this embodiment, the planarized value has twice the dynamic range of the original texture, i.e., the value can range from −1 to +2. Nevertheless, since one less bit is used for the texture data due to the bit used for the texture rule, minimal extra memory is needed to accommodate this additional range.

The modified texel value can be easily calculated for any of the four texels in the quadrilateral using the equations listed in TABLE 1. In TABLE 1, the diagonals and triangles are defined in terms of vertex and polygon position in the quadrilateral 78 (For example, UL=Upper Left, LR=Lower Right, etc.). For illustration purposes, exemplary numeric references from FIGS. 4a and 4b are provided in parenthesis following the abbreviations in the table.

TABLE 1

| TEXTURE RULE | TRIANGLE PIXEL IS INSIDE | PIXEL TO BE MODIFIED | PIXEL EQUATION |
| --- | --- | --- | --- |
| UL–LR (80b–80d) | UR (90) | LL (80a) | UL + LR − UR (80b + 80d − 80c) |

TABLE 1-continued

| TEXTURE RULE | TRIANGLE PIXEL IS INSIDE | PIXEL TO BE MODIFIED | PIXEL EQUATION |
| --- | --- | --- | --- |
| LL–UR (80a–80c) | UL (86) | LR (80d) | LL + UR – UL (80a + 80c – 80b) |
| LL–UR (80a–80c) | LR (88) | UL (80b) | LL + UR – LR (80a + 80c – 80d) |
| UL–LR (80b–80d) | LL (92) | UR (80c) | UL + LR – LL (80b + 80d – 80a) |

This embodiment can be used in systems that perform both bi-planar and bi-linear interpolation. Such a system may be desirable because the bi-linear blend technique produces better approximations of the actual texture values for some texture motifs. Thus, additional accuracy may be obtained by using a rule that can accommodate both bi-linear and bi-planar blending. However, if this approach is used, either additional memory must be provided or fewer bits used for the texture data because two bits are required for this type of rule.

In any event, statistical analysis suggests that 80% of the potential improvement available with a three-choice rule (bi-linear blend plus the two diagonals) is achieved with just the two diagonal choices. Consequently, even though a two bit rule may provide a slight increase in quality for a few texture motifs, a simple one bit rule will provide substantial increases in image quality for the majority of texture motifs.

If the bi-planar process is disabled in the above embodiment, the planar texture interpolator 48 always outputs the unmodified texture data. In this case, for compatibility purposes it is probably acceptable to let the rule bit be treated as texture data.

Once the texture value for a pixel is interpolated, the image generator 20 (FIG. 1) blends the texture data and polygon data and writes the resultant pixel data to the frame buffer 22. When the pixel associated with the pixel data in the frame buffer 22 is to be displayed, the pixel data is read out of the frame buffer 22 and sent to the display device 24. The display device 24 converts the pixel data into electrical signals that are used to illuminate the pixels on the display screen. The combined effect of the illuminated pixels forms the displayed image a viewer sees on the screen.

The present invention provides an improved displayed image in a number of respects. First, by controlling which diagonal cuts the quadrilateral, Mach bands are reduced or at least not emphasized along the exterior edges of each quadrilateral. In addition, new Mach bands are created along the diagonal. Because the suppression and creation of Mach bands are tied to the texture motif, the resulting interpolation reconstructs a better rendition of what was originally desired. In effect, the creation and suppression of Mach banding is used to preserve and emphasize the intended motif.

Second, motifs with high-contrast thematic edges (e.g., roads, etc.) are depicted properly when they traverse the texel grid at 45 degrees rather than only being depicted properly when they are aligned with the texture axes. In addition, motif edges that lie at other orientations are approximated more accurately. Moreover, the overall distortion is reduced for all high-contrast edges.

Third, the apparent sharpness and contrast of high-contrast changes in the motif is improved because the present invention provides a better approximation of the spatial localization and orientation of these changes. In effect, the texture motif looks sharper—perhaps by as much as half a MIP level. This is a significant and serendipitous result.

Fourth, the construction of new Mach bands along the diagonals injects additional high-frequency information—generally correlated with the motif-that makes visual "sense" while also enhancing the sense of sharpness and contrast. In sum, the use of bi-planar interpolation instead of bi-linear blending results in dramatically improved image quality for the majority of texture motifs.

The disclosed embodiment would generally be implemented using standard computer graphics system components. Thus, the polygon memory 28 (FIG. 1), texture memory 38 and the memory associated with any processors typically would be implemented using a conventional RAM data memory. Nevertheless, these components may be implemented using any suitable data storage method. In addition, the polygon memory 28 and texture memory 38 may be implemented using separate memory components, the same memory component or may be incorporated into the image generator 20 or the processors depending on the selected system design.

The image generator 20 would typically consist of a central processor unit and graphics processor, the basic concepts of which are disclosed in the book *Fundamentals of Interactive Computer Graphics*, Foley and Van Dam, 1984, Addison-Wesley Publishing Company, at chapters 4 and 18. The details of polygon rendering and pixel processing and the corresponding structures used to implement these processes are well known in the computer graphics art. Several of these techniques and structures are discussed at length in the above referenced books *Computer Graphics:Principles and Practice*, Foley, van Dam, Feiner & Hughes, and *Principles of Interactive Computer Graphics*, Newman and Sproull.

The texture rule generator and polygon generator operations described above typically would be implemented using a computer-based system such as a computer-aided design system, for example. These operations could be performed on the same or different processors. The planar texture interpolator 48 operations described above typically would be implemented by the image generator 20. However, in some embodiments, some of the above functions may be implemented using other functionally equivalent components including, but not limited to, discrete comparators, data selectors, data multiplexors and the like. The details of these and related implementations are well known in the art of computer systems and computer graphics systems.

The frame buffer 22 may be implemented using a wide variety of data storage devices including, but not limited to, conventional RAM devices. Finally, the display device 24 can be implemented using any pixel-based display. Techniques for scanning frame buffers to drive displays pixel-by-pixel are well known in the art. For example, various formats for organizing and scanning frame buffers to drive displays pixel-by-pixel are discussed in the textbook *Computer Graphics: Principles and Practice*, 2nd Edition, Foley, van Dam, Feiner & Hughes, (Reprinted in 1991)(1990), by Addison-Wesley Publishing Company, at chapters 4 and 18.

The lines 30, 32, 40, 42, 50 and 52 (FIG. 1) generally represent the flow of data from one operation to another. Thus, these lines may be implemented using any number of data flow techniques including, but not limited to, data busses that connect the data ports of discrete components or busses that are located inside integrated components. In addition, in integrated computer graphics systems, the flow of data from one component block to another may be implemented using computer program parameter passing operations, inter-process communications or other software techniques.

Figure 8:
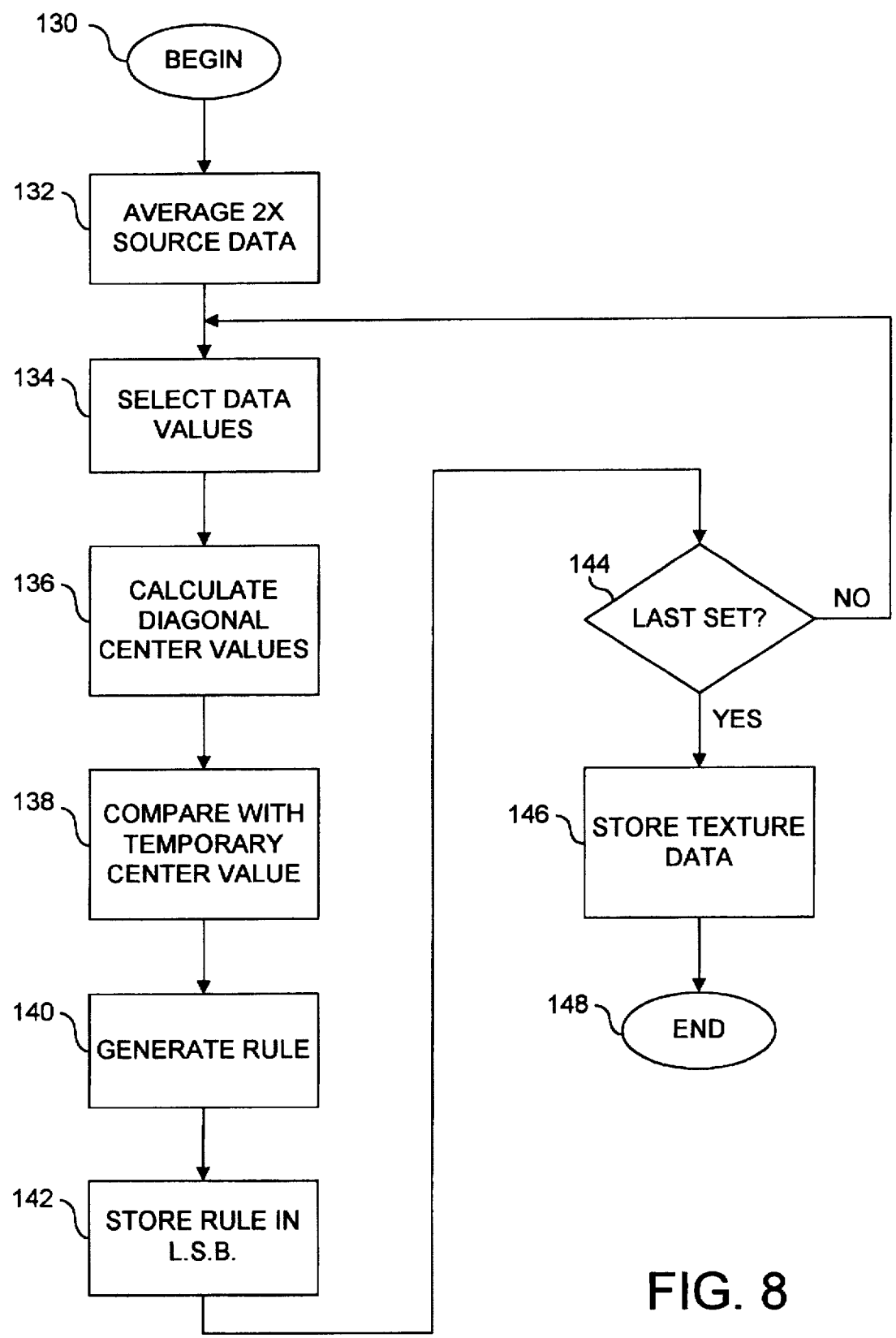
FIG. 8 is a block diagram illustrating texture generation process using 2X texture source data.
Figure 9:
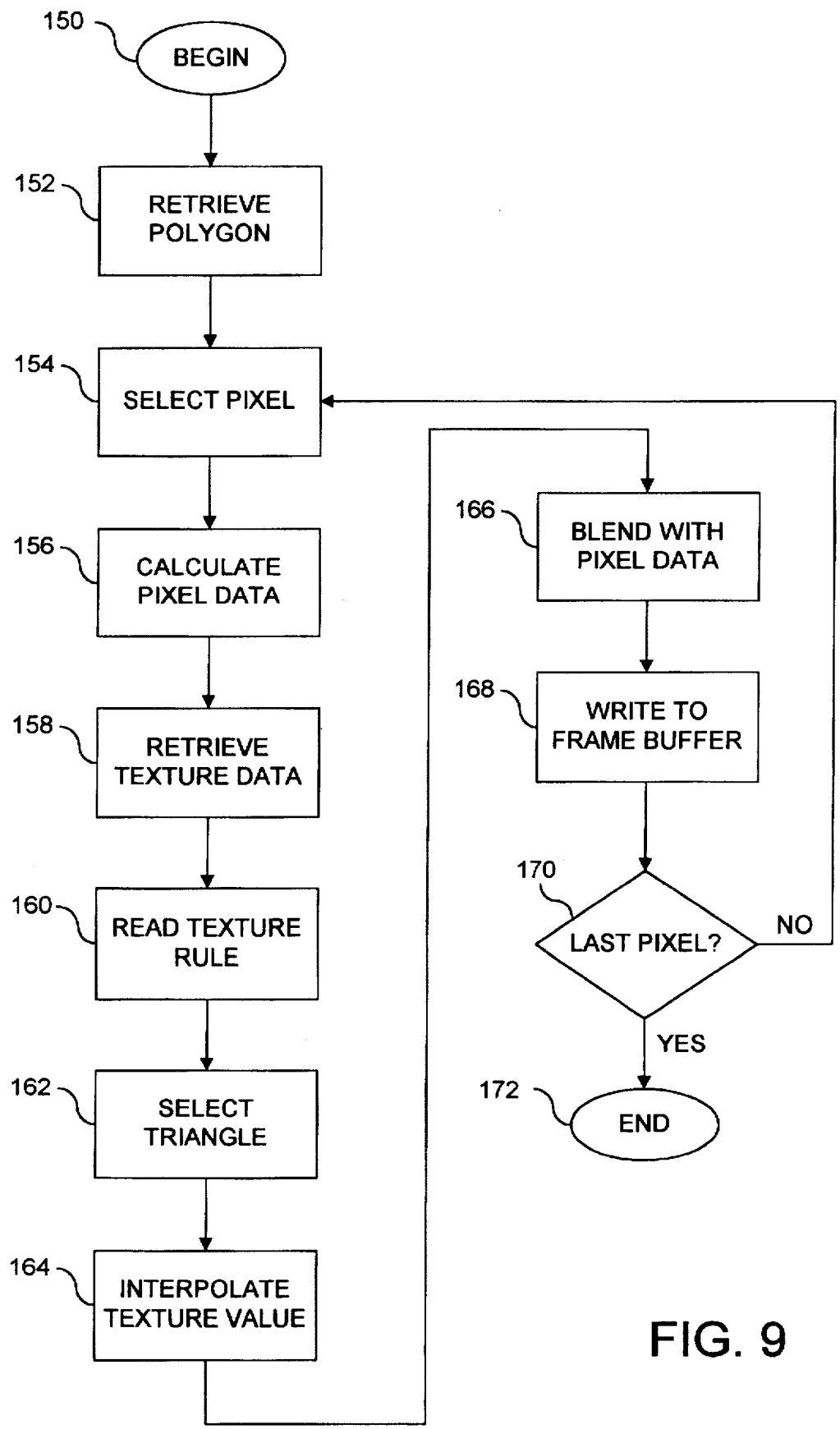
FIG. 9 is a block diagram illustrating another embodiment of a system constructed according to the present invention.

With the structure and function of the components of the present invention in mind, the basic operation of texture rule generation and texture plane interpolation processes performed by the embodiment of FIG. 1 is treated in FIGS. 8 and 9, respectively.

Referring to FIG. 8, a typical texture generation process using 2X texture source data is illustrated starting at a block 130 (upper left). At a block 132, the texture generator 34 (FIG. 1) averages the 2X source data (e.g., points 94 in FIG. 5a) to form output texture data (e.g., output data 96a) and temporary center values (e.g., center value 98).

As discussed above, a texture rule is defined for each set of four adjacent output data values that define a quadrilateral in the texture space (e.g., output data 96a, 96b, 96c and 96d in FIG. 5a). Accordingly, the steps described in blocks 134 through 142 are performed for each unique set of four output data values before the data is written to the texture map.

Starting at block 134, the texture rule generator 36 (FIG. 1) selects a set of four adjacent output data values defining a quadrilateral. As illustrated in FIG. 5a, these four values define two diagonals.

As represented by a block 136, the texture rule generator 36 calculates a texture value corresponding to the center of each diagonal. Then, the texture rule generator compares each of these diagonal center values with the associated temporary center value at a block 138.

As represented by a block 140, the diagonal with a center value that is closest to the temporary center value is selected as the rule. This rule is coded into a data bit and stored in the least significant bit of the lower left output data in the quadrilateral (e.g., output data 96e in FIG. 5c) at a block 142.

As represented by a block 144, the process returns back to the block 134 where another set of four output data values are selected and the above steps are repeated until all the texture rules have been generated. On the other hand, if all the rules for the texture data have been generated, the process proceeds to a block 146 where the texture generator 34 writes the output data (which now includes the texture rules) to the texture memory 38. The process then terminates at the block 148.

Referring now to FIG. 9, a typical textured polygon rendering process is illustrated beginning at a block 150. The image generator 20 (FIG. 1) retrieves the polygon definitions for a given polygon from the polygon memory 28 (block 152). These polygon definitions are processed pixel-by-pixel to generate pixel data for the appropriate pixels in the display. Accordingly, the steps described in blocks 154 through 168 are performed for each pixel to which the polygon is mapped.

Starting at block 154, the image generator 20 first selects one of the pixels to which the polygon is mapped. Next, as represented by a block 156, the image generator 20 uses the polygon definitions to calculate the pixel data for this pixel.

Since the polygon being rendered is textured, the texture data mapped to the area of the polygon that maps to the pixel being processed (e.g., in FIG. 2 the texture 68 within footprint 66 on polygon 58 maps to the pixel 60) must be blended with the pixel data calculated at block 156. As represented by a block 158, the image generator 20 selects the appropriate level-of-detail in the MIP map and retrieves the four texture data values from the texture memory 38 that form a quadrilateral around the area on the polygon that corresponds to the pixel. For example, referring to FIG. 3, texture data corresponding to texels 72a, 72b, 72c and 72d would be used to generate the texture value for pixel 60c.

Next, at a block 160, the planar texture interpolator 48 reads the texture rule from the least significant bit of the lower left texture data in the quadrilateral (e.g., texel 72a in FIG. 3). This rule, in turn, defines one of two diagonals (e.g., diagonal 84 in FIG. 4b).

As represented by a block 162, one of the two triangles defined by the diagonal (e.g., triangle 86 or 88 in FIG. 4b) is selected based on the location of the pixel within the quadrilateral defined by the texture data (e.g., the location of pixel 60c in FIG. 3 is defined by the center point 108).

Using the plane defined by the triangle selected at block 162, the planar texture interpolator 48 interpolates the texture value at the point in the plane (e.g., point 110 in FIG. 4b) that corresponds to the pixel (block 164).

As discussed above, at a block 166 this texture value is blended with the pixel data calculated at block 156. The image generator 20 then writes the resultant pixel data to the frame buffer 22 (block 168) from which the data is sent to the display device 24.

As represented by a block 170, if more pixels need to be processed, the process returns back to the block 154 where another pixel is selected. On the other hand, if all the pixel data for this polygon has been generated, the process proceeds to a block 172 and the rendering process for this polygon terminates.

From the above, it is apparent that the system disclosed herein utilizing texture rules and planar texture interpolation offers an improved system for interpolating texture map data. Recognizing that the system can be implemented with standard graphics components, it should be noted that considerable variation may occur in the specific components and operating format. The scope of the present invention should be determined with a reference to the claims set forth below.

What is claimed is:

1. A computer graphics system for producing dynamic images having textured features using graphics image data and texture data elements representative of said textured features comprising:

a texture rule generator to generate a texture rule indicative of texture variation within an area defined by said texture data elements;

data storage for said graphics image data and said texture data elements;

a texture interpolator to interpolate a texture value from said texture data elements using said texture rule;

a polygon processor coupled to receive said image data and said interpolated texture value to provide display signals representative of said dynamic images; and a display device coupled to receive said display signals to produce said dynamic images.

2. The computer graphics system of claim 1 wherein said texture rule generator further includes a contour detector to detect a contour defined by said texture variation.

3. The computer graphics system of claim 2 wherein said contour detector includes a diagonal selector to select one of two diagonals of a quadrilateral defined by said texture data elements, said selected diagonal defining said texture rule.

4. The computer graphics system of claim 3 wherein said diagonal selector includes:

a center value calculator to calculate a center texture value corresponding to a center of said quadrilateral;

a diagonal value calculator to calculate a diagonal center texture value;

a comparator to compare said center texture value with said diagonal center texture value; and a selector responsive to said comparator to select one of said two diagonals.

5. The computer graphics system of claim 2 wherein said contour detector detects a texture ridge.

6. The computer graphics system of claim 2 wherein said contour detector detects a texture valley.

7. The computer graphics system of claim 1 wherein said texture interpolator includes a plane selector to select at least one plane defined by said texture data elements.

8. The computer graphics system of claim 7 wherein said plane selector uses said texture rule to select two planes in a quadrilateral defined by said texture data elements.

9. The computer graphics system of claim 8 wherein said plane selector includes a blend fraction comparator to compare a pixel U-fraction with a pixel V-fraction to select one of said two planes.

10. The computer graphics system of claim 7 wherein said texture interpolator includes a planar interpolator to interpolate a texture value within said at least one plane.

11. The computer graphics system of claim 1 wherein said texture rule is stored with said texture data elements.

12. A computer graphics process for producing dynamic images with textured features using graphics image data and texture data elements representative of said textured features, comprising the steps of:

selecting a plurality of said texture data elements;

generating a texture rule indicative of texture variation within an area defined by said selected texture data elements;

interpolating a texture value from said selected texture data elements using said texture rule;

processing said texture value and said graphics image data to provide display signals representative of said dynamic images; and displaying said dynamic images in accordance with said display signals.

13. A computer graphics process according to claim 12 wherein said generating a texture rule includes the step of selecting one of two diagonals in a quadrilateral defined by said selected texture data elements.

14. A computer graphics process according to claim 13 wherein said selecting one of two diagonals includes the steps of:

calculating a center texture value corresponding to the center of a quadrilateral defined by said selected texture data elements;

calculating a diagonal center texture value; comparing said center texture value with said diagonal center texture value; and selecting, responsive to said comparing, one of said two diagonals.

15. A computer graphics process according to claim 12 wherein said interpolating a texture value includes the step of selecting a plane defined by said texture data elements.

16. A computer graphics process according to claim 15 wherein said interpolating a texture value includes the step of interpolating a texture value within said plane.

17. A computer graphics process according to claim 12 wherein said interpolating a texture value includes the step of selecting two planes defined by said selected texture data elements and said texture rule.

18. A computer graphics process according to claim 17 further including the step of selecting one of said two planes by comparing a pixel U-fraction with a pixel V-fraction.

19. A computer graphics process according to claim 12 further including the steps of:

storing said texture rule in a data memory; and retrieving said texture rule from said data memory.

20. A computer graphics process according to claim 19 wherein said texture rule is stored with said texture data elements.

21. A computer graphics process according to claim 12 wherein said generating a texture rule includes the step of determining whether said texture variation defines a ridge.

22. A computer graphics process according to claim 12 wherein said generating a texture rule includes the step of determining whether said texture variation defines a valley.

23. A computer graphics process for producing dynamic images with textured features using graphics image data and texture data elements representative of said textured features, comprising the steps of:

selecting a plurality of said texture data elements;

defining a three-dimensional plane using said plurality of said texture data elements;

interpolating a texture value at a location within said plane;

processing said texture value and said graphics image data to provide display signals representative of said dynamic images; and displaying said dynamic images in accordance with said display signals.

* * * * *